(12) United States Patent
Smye-Rumsby et al.

(10) Patent No.: US 11,225,264 B2
(45) Date of Patent: Jan. 18, 2022

(54) REALTIME DRIVER ASSISTANCE SYSTEM

(71) Applicant: International Business Machines Corporation, Armonk, NY (US)

(72) Inventors: Adam J. Smye-Rumsby, Reading, PA (US); Hernan A. Cunico, Holly Springs, NC (US); Paul A. R. Frank, Hamburg (DE); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 16/136,296

(22) Filed: Sep. 20, 2018

(65) Prior Publication Data

US 2020/0094851 A1 Mar. 26, 2020

(51) Int. Cl.
*B60W 50/14* (2020.01)
*G09B 5/02* (2006.01)

(52) U.S. Cl.
CPC ............... *B60W 50/14* (2013.01); *G09B 5/02* (2013.01); *B60W 2540/30* (2013.01)

(58) Field of Classification Search
CPC ............. B60W 50/14; B60W 50/0098; B60W 50/085; B60W 2520/105; B60W 2520/125; B60W 2520/14; B60W 2520/16; B60W 2520/18; B60W 2520/04; B60W 2520/10; B60W 2520/12; B60W 2530/14; B60W 2040/0881; B60W 2050/146; B60W 40/09; B60W 2756/10; B60W 2540/01; B60W 2540/043; B60W 2540/045; B60W 2540/047; B60W 2540/30; B60W 2720/10; B60W 2720/12; B60W 2720/14; B60W 2720/16; B60W 2720/18; B60K 31/16; B60K 31/18; B60K 35/00; B60K 2031/0091
See application file for complete search history.

(56) References Cited

U.S. PATENT DOCUMENTS 8,634,980 B1 * 1/2014 Urmson ............... B60W 50/14
 701/23
8,688,378 B2 4/2014 McCall et al.
(Continued)

OTHER PUBLICATIONS

Disclosed Anonymously, "Lightweight Characteristic Matching for Ride Sharing Applications", An IP.com Prior Art Database Technical Disclosure, IP.com No. IPCOM000250093D, IP.com Electronic Publication Date: May 31, 2017, 5 pages.
(Continued)

*Primary Examiner* — Thomas G Black
*Assistant Examiner* — Brandon Z Willis
(74) *Attorney, Agent, or Firm* — Randy E. Tejeda

(57) ABSTRACT

In an approach, one or more computer processors determine that a user is in a vehicle. The one or more computer processors identify historical vehicle occupancy data of the user. The one or more computer processors monitor one or more driving metrics of the vehicle while the user is an occupant. The one or more computer processors determine whether a vehicle exceeds a threshold based, at least in part, on a comparison of the monitored one or more driving metrics and the identified historical vehicle occupancy data. The one or more computer processors determine an action based, at least in part, on the vehicle exceeding the threshold.

18 Claims, 5 Drawing Sheets

(56) References Cited

U.S. PATENT DOCUMENTS

| | | | |
|---|---|---|---|
| 8,958,975 B2 | | 2/2015 | Savaresi et al. |
| 9,533,640 B2 | * | 1/2017 | Rai |
| 9,697,503 B1 | * | 7/2017 | Penilla .................. B60K 35/00 |
| 9,988,055 B1 | * | 6/2018 | O'Flaherty ............ G08B 21/02 |
| 10,618,523 B1 | * | 4/2020 | Fields ............. B60W 60/00182 |
| 10,696,249 B2 | * | 6/2020 | Heinrich .............. A61B 5/4552 |
| 2006/0276960 A1 | | 12/2006 | Adamczyk et al. |
| 2009/0177502 A1 | | 7/2009 | Doinoff et al. |
| 2010/0280854 A1 | | 11/2010 | Huang et al. |
| 2011/0106370 A1 | | 5/2011 | Duddle et al. |
| 2013/0066688 A1 | * | 3/2013 | Pinkus .................. G06Q 50/26 |
| | | | 705/7.41 |
| 2014/0324505 A1 | | 10/2014 | Lerenc et al. |
| 2016/0347325 A1 | | 12/2016 | Phillips |
| 2017/0217445 A1 | * | 8/2017 | Tzirkel-Hancock ......................... |
| | | | B60W 50/10 |
| 2018/0089605 A1 | | 3/2018 | Poornachandran et al. |

OTHER PUBLICATIONS

Donath et al., "Smartphone Based Novice Teenage Driver Support System", © 2018 Regents of the University of Minnesota, Last modified on Tuesday, Nov. 12, 2013, 2 pages, <http://www.its.umn.edu/Research/ProjectDetail.html?id=2009015 >.

"In-vehicle Performance Monitoring and Feedback", US Department of Transportation, Updated: Monday, Oct. 26, 2015, 3 pages, <https://www.transportation.gov/mission/health/In-vehicle-Performance-Monitoring-and-Feedback>.

* cited by examiner

| USER ID | 00973125 |
|---|---|
| MAX SPEED (mph) | 75 |
| MAX ACCELERATION (g) | .63 |
| AVG ACCELERATION (g) | .47 |
| MAX BRAKING (g) | 1.02 |
| AVG BRAKING (g) | .81 |
| MAX CORNERING (g) | .92 |
| AVG CORNERING (g) | .76 |
| MIN FOLLOWING DISTANCE (ft) | 10 |
| LAST UPDATE | 03/01/2017 17:46:29 |

| DRIVER ID | 10221895 |
|---|---|
| DRIVER AGE | 29 |
| TRIP ID | 20489282 |
| VEHICLE TYPE | SUV |
| DESTINATION | 1600 PENNSYLVANIA AVENUE |
| PICK UP LOCATION | 900 OHIO DRIVE |
| WEATHER | OVERCAST |
| USER ID | 00973125 |
| USER PARAMETER MAX ACCELERATION (g) | .63 |
| USER PARAMETER AVG ACCELERATION (g) | .47 |
| OFFENSE TYPE | MAX ACCELERATION DEVIATION |
| DEVIATING METRIC | .92 |
| OFFENSE CORRECTED | FALSE |
| OFFENSE TIMESTAMP | 06/09/2017 11:23:56 |

REALTIME DRIVER ASSISTANCE SYSTEM

BACKGROUND

The present invention relates generally to the field of driver-assistance systems, and more particularly to providing real-time driver coaching.

On-board diagnostics (OBD) is an automotive term referring to a vehicle's self-diagnostic and reporting capability. OBD systems give the vehicle owner or repair technician access to the status of the various vehicle subsystems. The amount of diagnostic information available via OBD has varied widely since its introduction in the early 1980s. Early versions of OBD would simply illuminate a malfunction indicator light if a problem was detected but would not provide any information as to the nature of the problem. Modern OBD implementations use a standardized digital communications port to provide real-time data in addition to a standardized series of diagnostic trouble codes (DTCs), which allow one to rapidly identify and remedy malfunctions within the vehicle. OBD information is commonly used by vehicle telematics devices that perform fleet tracking, monitor fuel efficiency, prevent unsafe driving, as well as for remote diagnostics and pay-as-you-drive insurance. Although originally not intended for the above purposes, commonly supported OBD data such as vehicle speed, revolutions per minute (RPM), and fuel level allow global position system (GPS) based tracking devices to monitor vehicle idling times, speeding, and over-revving.

SUMMARY

Embodiments of the present invention disclose a method, a computer program product, and a system for providing real-time driving coaching. The method includes one or more computer processors determining that a user is in a vehicle. The one or more computer processors identify historical vehicle occupancy data of the user. The one or more computer processors monitor one or more driving metrics of the vehicle while the user is an occupant. The one or more computer processors determine whether a vehicle exceeds a threshold based, at least in part, on a comparison of the monitored one or more driving metrics and the identified historical vehicle occupancy data. The one or more computer processors determine an action based, at least in part, on the vehicle exceeding the threshold.

DETAILED DESCRIPTION

Transportation providers (e.g., trucks, buses, taxis, trains, ride shares, personal and automated vehicles, etc.) are responsible for ensuring the safety, quality, and comfort of passengers and/or goods, while in transit. As different goods need to be packaged and transported differently to ensure quality, different passengers, with varying transit preferences and apprehensions, need to be transported differently. For example, transporting children has different considerations and concerns compared to transporting adults. In this example, the driver of a child may reduce acceleration to provide the child with a safer and more enjoyable riding experience while this may be a nonissue for adults. Transportation providers struggle to predict passenger preferences and how to transport in a manner that maximizes passenger comfort and safety. Furthermore, as ride shares and taxis continue to rise in popularity, the need to identify and recognize passenger characteristics is imperative. Specifically, passenger feedback for ride shares and taxis is given after the ride is complete. Moreover, the feedback is regulated to an overall rating of the trip without the inclusion of any specific issues and details.

This lack of real-time, in transit feedback can lead to unsafe, uncomfortable, and potentially dangerous driving. Embodiments of the present invention recognize that increased passenger (i.e., user, customer) satisfaction, comfort, and safety may be gained by informing/providing a driver with real-time feedback based on a profile containing sets of parameters related to the personal driving profiles and patterns. Embodiments of the present invention initially determine the profile for a user based on analyzing user historical vehicle occupancy behaviors and patterns and subsequently derives/refines the user profile by utilizing subsequent trips with the user traveling as a driver or passenger. Implementation of embodiments of the invention may take a variety of forms, and exemplary implementation details are discussed subsequently with reference to the Figures.

Figure 1:
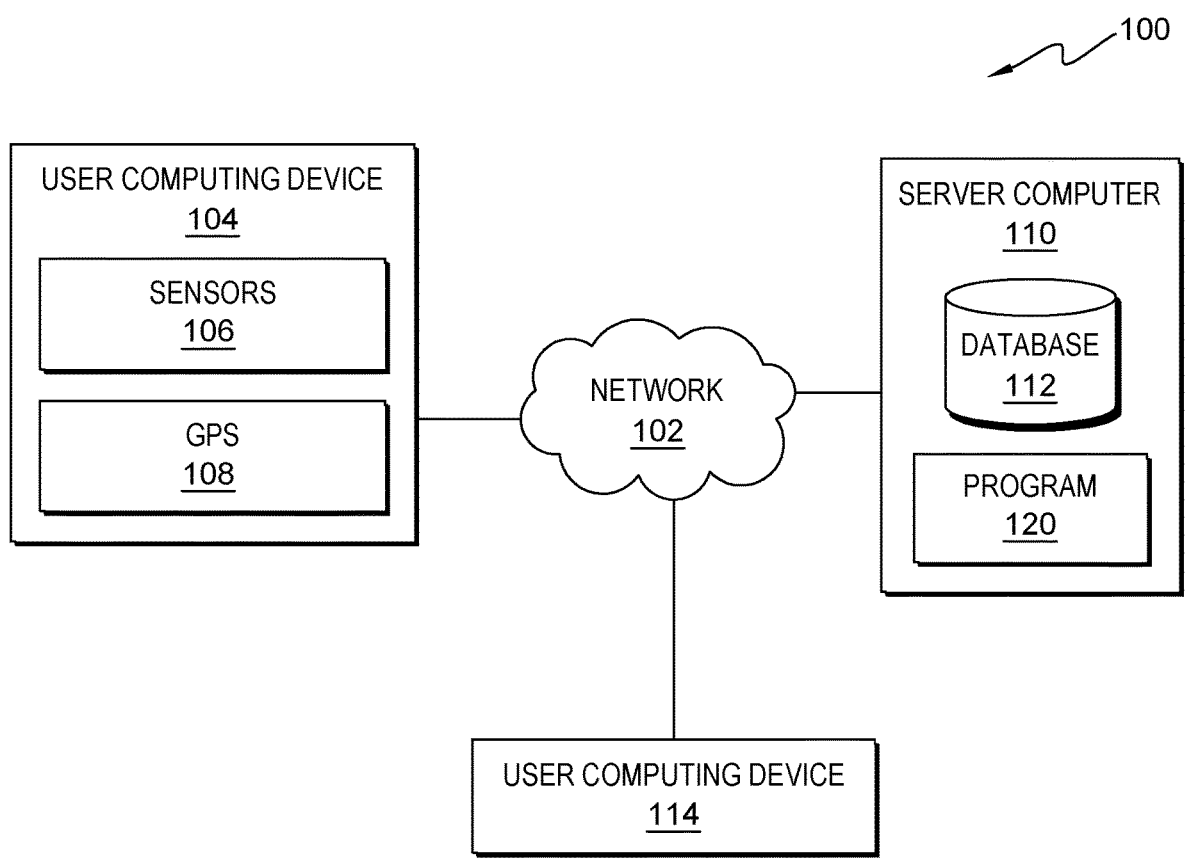
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically, distinct devices that operate together as a single computer system. FIG. 1 provides only an illustration of one embodiment and does not imply any limitations with regard to the environments in which different embodiments may be implemented. Many modifications to the depicted environment may be made by those skilled in the art without departing from the scope of the invention as recited by the claims.

Distributed data processing environment 100 includes user computing device 104, server computer 110 and user computing device 114, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between user computing device 104, server computer 118, user computing device 114, and other computing devices (not shown) within distributed data processing environment 100.

User computing device 104 and user computing device 114 may each be a web server or any other electronic device or computing system capable of processing program instructions and receiving and sending data. In some embodiments, user computing device 104 and user computing device 114 may each be a laptop computer, a tablet computer, a netbook computer, a personal computer (PC), a desktop computer, a personal digital assistant (PDA), a smart phone, or any programmable electronic device capable of communicating with network 102. In other embodiments, user computing device 104 and user computing device 114 may each represent a server computing system utilizing multiple computers as a server system, such as in a cloud computing environment.

In another embodiment, user computing device 104 and user computing device 114 may each be a smart phone. Smart phones may be used as a telephone, digital camera and video camera, global positing system (GPS) navigation, a media player, clock, news, calculator, web browser, handheld video game player, flashlight, compass, an address book, note-taking, digital messaging, an event calendar, etc. In another embodiment, user computing device 104 and user computing device 114 may each be a wearable computer such as a smartwatch or a fitness tracker. Wearable computers are miniature electronic devices that may be worn by the bearer under, with, or on top of clothing, as well as in or connected to glasses, hats, or other accessories. Fitness trackers are devices or applications for monitoring and tracking fitness-related metrics such as user speed, acceleration, change in direction, distance traveled, calorie consumption, and biometric data such as heart and perspiration rates. In some embodiments, user computing device 104 is an onboard computer and associated sensors of an automobile (not shown) that are capable of communicating with server computer 110 over network 102. In other embodiments, the automobile may have multiple computing devices that each make up user computing device 104, where one or more of the multiple computing devices include user interfaces (not shown). In an example, user computing device 104 is a vehicle with a touch screen that enables the user to view and manipulate objects and controls based on user (i.e., driver) input.

In general, user computing device 104 and user computing device 114 each represent one or more programmable electronic devices or combination of programmable electronic devices capable of executing machine readable program instructions and communicating with other computing devices (not shown) within distributed data processing environment 100 via a network, such as network 102. User computing device 104 represents one or more devices associated with a driver. User computing device 114 represents one or more devices associated with a user (e.g., passenger). In the depicted embodiment, user computing device 104 includes sensors 106 and GPS 108. In other embodiments, user computing device 114 includes sensors 106 and GPS 108.

Sensors 106 is a device or sensor that is capable of measuring acceleration. Some solid-state accelerometers are based on microelectromechanical systems (MEMS). In various embodiments, accelerometers are able to detect the magnitude and the direction of acceleration/deacceleration, as well as orientation, coordinate acceleration, vibration, and shock. In an example, sensors 106 is capable determining motions changes in 6-axis: X (forward/back, surge), Y (left/right, sway), Z (up/down, heave), yaw, pitch, and roll. In an example, sensors 106 may measure sway, roll, and yaw during a cornering maneuver. In the depicted embodiment, sensors 106 is located within user computing device 104, however sensors 106 may also be located within user computing device 114 and/or any number of user computing devices known in the art such as a fitness tracker, smartwatch, and/or ODB device. In various embodiments, sensors 106 is within both user computing device 104, user computing device 114 and/or within any other capable computing device within environment 100.

GPS 108 is a device, receiver, or sensor that is capable of receiving information from GPS satellites and calculating the device's geographical position. In most embodiments, GPS 108 has a track algorithm that combines sets of satellite measurements collected at different times. After a set of measurements are processed, the track algorithm predicts the receiver location corresponding to the next set of satellite measurements. When the new measurements are collected, the receiver uses a weighting scheme to combine the new measurements with the tracker prediction. In general, a tracker can (a) improve receiver position and time accuracy, (b) reject bad measurements, and (c) estimate receiver speed and direction. GPS 108 also transmits information regarding the user orientation and speed.

Server computer 110 can be a standalone computing device, a management server, a web server, a mobile computing device, or any other electronic device or computing system capable of receiving, sending, and processing data. In other embodiments, server computer 110 can represent a server computing system utilizing multiple computers as a server system, such as in a cloud computing environment. In another embodiment, server computer 110 can be a laptop computer, a tablet computer, a netbook computer, a personal computer (PC), a desktop computer, a personal digital assistant (PDA), a smart phone, or any programmable electronic device capable of communicating with user computing device 104, user computing device 114 and other computing devices (not shown) within distributed data processing environment 100 via network 102. In another embodiment, server computer 110 represents a computing system utilizing clustered computers and components (e.g., database server computers, application server computers, etc.) that act as a single pool of seamless resources when accessed within distributed data processing environment 100. In the depicted embodiment, server computer 110 includes database 112 and program 120. In other embodiments, server computer 110 may contain other applications, databases, programs, etc. which have not been depicted in distributed data processing environment 100. Server computer 110 may include internal and external hardware components, as depicted and described in further detail with respect to FIG. 5.

Database 112 is a repository for data used by program 120. In the depicted embodiment, database 112 resides on server computer 110. In another embodiment, database 112 may reside on user computing device 104, user computing device 114, or elsewhere within distributed data processing environment 100 provided program 120 has access to database 112. A database is an organized collection of data. Database 112 can be implemented with any type of storage device capable of storing data and configuration files that can be accessed and utilized by program 120, such as a database server, a hard disk drive, or a flash memory. In an embodiment, database 112 stores data used by program 120, such as user profiles and/or parameters. In a further embodiment, database 112 also stores user historical vehicle occupancy data, such as driver parameters, past trips, offenses, and previous corrections and/or remedial actions. Database 112 may also store one or more user parameters associated with default or pre-defined values including, but not limited to, maximum driver speed, maximum driver acceleration and/or maximum braking force. In an embodiment, database 112 contains rules for each parameter which include a condition-action pair. In another embodiment, database 112 may be a geographic information system (GIS) database.

Program 120 leverages user preferences, parameters and historical vehicle occupancy data to provide real-time driving coaching to ensure that the driver is operating the vehicle within designated user parameters. In the depicted embodiment, program 120 resides on server computer 110. In another embodiment, program 120 may reside on user computing device 104 and/or user computing device 114. In a further embodiment, program 120 may reside elsewhere within distributed data processing environment 100 provided that program 120 has access to user computing device 104, user computing device 114 and database 112. In various embodiments, client versions of program 120 reside on user computing device 104, user computing device 114, and/or any other computing device (not depicted) within environment 100. Client versions of program 120 include subsets of functionality that appear in the hosted version of program 120 on server computer 110 such as recording driver measurements, displaying information and/or providing a medium for feedback. For example, a client version of program 120 on user computing device 114 includes only the ability to record driving measurements and user feedback. In another example, a client version of program 120 that executes on user computing device 104 includes the ability to receive corrective/remedial notifications.

In various embodiments, the term "vehicle" should be construed having a broad meaning and should include all types of vehicles. Non-limiting examples of vehicles include: passenger cars, trucks, motorcycles, off-road/all-terrain vehicles, buses, boats, airplanes, helicopters, recreational vehicles, farm vehicles, construction vehicles, trams, golf carts, trains, and/or trolleys. In various embodiments, the term "drive" should be construed having a board meaning and should include operating all types of vehicles as delineated above.

In some embodiments, program 120 may implement the following steps. Program 120 creates a user profile. Program 120 loads the user profile. Program 120 records driver operating measurements. Program 120 determines whether the driver is operating within the user profile. If program 120 determines the driving measurements are not within the bounds of the user profile, then program 120 sends an action to the driver. Program 120 determines whether the trip is complete. If program 120 determines that the trip has completed, then program 120 updates the user parameters based on the metrics of the completed trip and/or receives user feedback. Program 120 is depicted and described in further detail with respect to FIG. 2.

Figure 2:
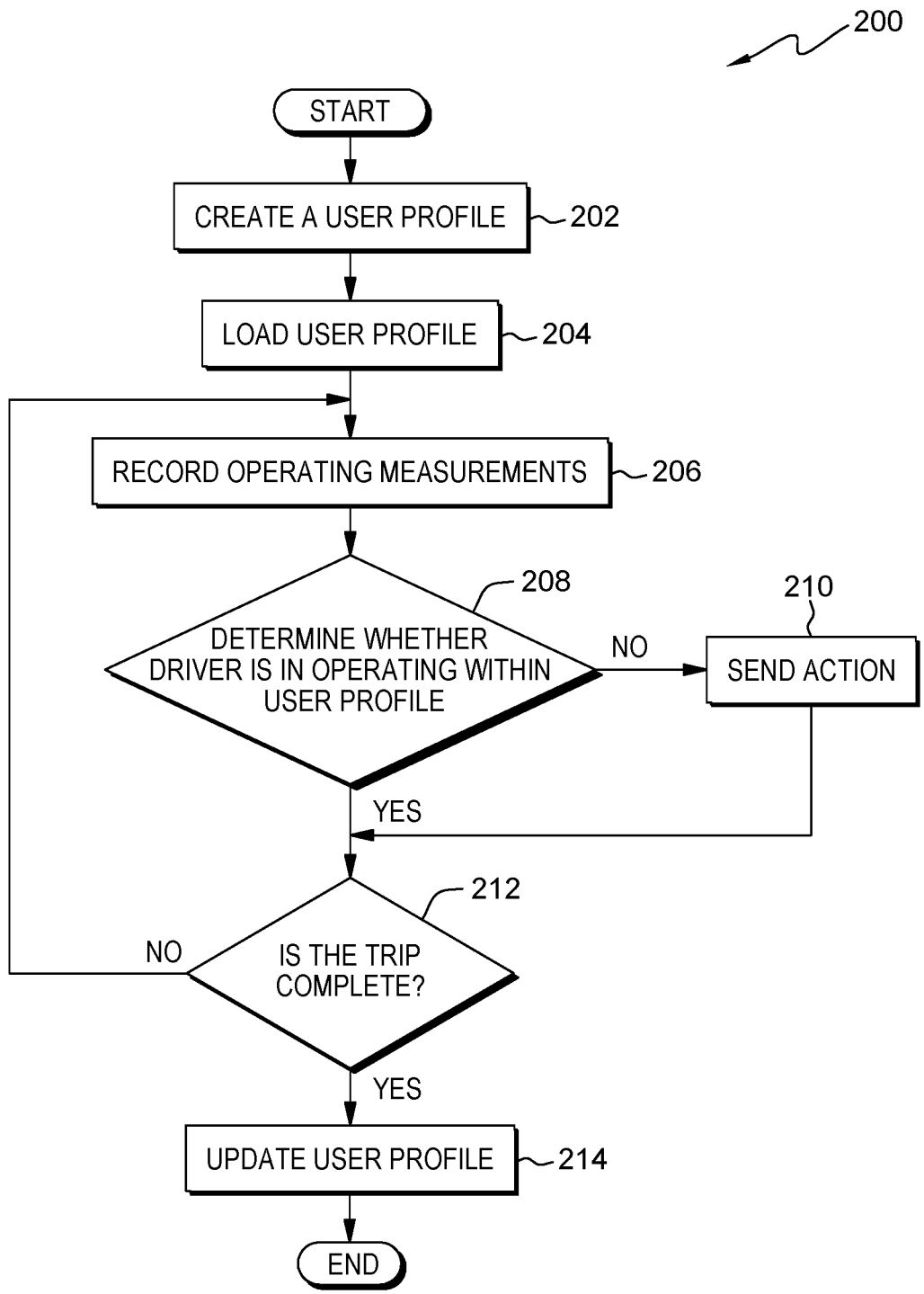
FIG. 2 is a flowchart depicting operational steps of a program, on a server computer within the data processing environment of FIG. 1, for real-time driver coaching, in accordance with an embodiment of the present invention.

FIG. 2 is a flowchart depicting operational steps of program 120, on a server computer 110 within distributed data processing environment 100 of FIG. 1, for providing real-time driving coaching, in accordance with an embodiment of the present invention.

Program 120 creates user profile (step 202). In an embodiment, a user profile may include a plurality of user parameters, historical offenses, and data describing past trips, such as whether the user was a driver or a passenger, road features (e.g., highway, city, and country), weather, traffic conditions, and user comfort level. For example, a user profile includes information regarding a previous trip where a user drove on a highway in low traffic, reaching a max speed of 75 mph and an average acceleration of 0.63 g. In various embodiments, the user parameters may include, but are not limited to, maximum/average speed, maximum/average acceleration force, maximum/average braking force, minimum/average following distance, maximum/average cornering g-forces, and related timestamp information. The parameters and associated data may be stored in a table similar to the one depicted in FIG. 3.

In a further embodiment, the user may add or remove parameters based on personalized requirements and/or preferences. For example, a user, not concerned with how close a driver travels behind vehicles, removes the following distance parameter preventing program 120 from monitoring said parameter. In addition, the user profile may include biometric information (e.g., heart, breathing, and perspiration rates) from a wearable computing device such as a fitness tracker or smartwatch. For example, the heartrate of a user is normally 65 beats per minute (BPM) when driving oneself. In this example, program 120 sets the user heartrate parameter to 65 BPM. In various embodiments, elements included within a measurement profile within a user profile are customizable (e.g., parameters can be added or excluded). The measurement profile controls the operation of measurement devices such as device specific sampling rates, processing devices (e.g., user computing device 104, user computing device 114, server computer 110, etc.), etc.

In one embodiment, program 120 may create a user profile from user historical vehicle occupancy data with the user either as a driver or passenger. Program 120 utilizes the driving behaviors, metrics, and patterns of the user to create a driving profile of the user. In some scenarios, program 120 determines information for a driving profile based on individual trips. In an example scenario, a user, while driving a vehicle, never exceeds 55 mph and rarely exceeds 0.6 g while taking corners. Thus, program 120 derives and sets the maximum speed parameter to 55 and the maximum cornering force parameter to 0.6 g. In other scenarios, program 120 aggregates and averages of a series of historical trips to create baseline parameters. In another embodiment, program 120 may associate GPS information with driving metrics in order to create location specific parameters. In a scenario, a user, typically, follows vehicles at a distance of 20 feet on the highway and 10 feet on city streets. In this example, program 120 derives two specific minimum following distance parameters, one for highways and another for city streets. In a further embodiment, program 120 may derive the parameters by utilizing machine learning techniques based on user preferences, user historical vehicle occupancy data, user presets, user feedback, GPS information, etc.

In another embodiment, program 120 may dynamically adjust and update user parameters as the user drives a vehicle. In one scenario, as a user drives a personal vehicle, program 120 records new driving metrics and adjusts the corresponding user parameters such as maximum speed, etc. In another scenario, if the user is in transit, as a passenger, then program 120 records the driving metrics; however, program 120 does not create nor update user parameters until the user logs a response (discussed in further detail with respect to step 214). For example, a new user begins a ride share trip and throughout the trip program 120 records the metrics of the driver but program 120 does not create or update user parameters until the user determines and logs what portions of the trip were satisfactory or unsatisfactory.

Still referring to step 202, in some embodiments, program 120 enables the user to predefine the parameters. For example, the user defines a maximum allowed speed of 60 mph along with a following distance of 30 feet. In the aforementioned example, program 120 utilizes a plurality of sensors (not shown) including, but not limited to, sonar, ultrasonic sensors, and/or electromagnetic sensors to detect distances between vehicles. In other embodiments, parameters may have constraints such as temporal constraints. For example, the user specifies a following distance of 40 feet and a maximum speed of 70 mph after eleven pm. In yet another embodiment, the user profile may extend from a rider profile on a plurality of ride sharing applications. For example, program 120 incorporates aspects of a ride sharing profile that includes a unique user ID, user photograph, payment methods, details regarding previous trips, etc. In another embodiment, a governmental regulatory body may define the parameters. For example, a town enforces a speed limit of 35 mph, program 120 defines the maximum speed parameter to match the speed limit at 35 mph. In other embodiments, program 120 may derive the parameters from other user profiles, for example, a set of regional users.

Program 120 loads user profile (step 204). In various embodiments, in response to an instance of user computing device 114 communicating with program 120, program 120 identifies the user associated with a registered instance of user computing device 114. For example, if a user registers a mobile device, and when the user utilizes the mobile device (e.g., user computing device 114), then program 120 can recognize the user associated with the registered mobile device. In one embodiment, program 120 receives the identity of the user from a ride sharing application (not shown). For example, a user requests a driver, in response to the user commencing the trip, program 120 receives a notification. In another embodiment, program 120 receives a notification that the user has entered a vehicle. In an embodiment, program 120 receives a prompt from the user to begin program 120. In another embodiment, if the user of a computing device (e.g., user computing device 114) enters wireless communication range with a vehicle, then program 120 identifies the user of the registered computing device.

In some embodiments, program 120 loads the user profile into a plurality of available client computing devices such as user computing device 104 and/or user computing device 114. For example, program 120 loads the user profile into the computing device of the driver (e.g., smartphone, dash computer, smartwatch, etc.). In another embodiment, program 120 loads the user profile into all available computing devices in the vehicle. In other embodiments, program 120 loads the profile onto server computer 110 and allows devices to access the user profile, on demand, through network 102. In yet another embodiment, program 120 checks computing devices for outdated profile copies, updating the entire or part of the profile. For example, if a timestamp on a ride-sharing operator's copy of the user profile is not current, program 120 provides updated data to ensure the driver is coached based on the most current parameters.

In other embodiments, responsive to detecting the user and loading the user profile as discussed above, program 120 prompts, via a graphical user interface (not depicted), the user to designate whether the user is a driver or a passenger. Alternatively, the user may associate a computing device with a vehicle owned by the user, thus enabling program 120 to detect when the user is a driver. For example, a user pairs a wireless enabled computing device (e.g., user computing device 114) with a personal vehicle, when the user enters said vehicle with said device, program 120 detects the user and determines the user as a driver and not a passenger.

Program 120 records operating measurements (step 206). Program 120 monitors and updates the user profile with the metrics and forces exerted during a trip. In step 206, program 120 generates driving metrics when the user, with a previously created profile, is either driver or passenger. In an embodiment, program 120 utilizes user computing device 104 to measure, record and derive trip metrics. For example, when a passenger commences a ride share or taxi trip, program 120 records driver acceleration from the smartphone of the driver (e.g., user computing device 104), specifically utilizing sensors 106. In another embodiment, program 120 may utilize user computing device 114 to measure, record and derive the parameters. In some embodiments, program 120 utilizes a combination of user computing device 104, user computing device 114 and/or a plurality of other computing devices in environment 100.

In various embodiments, program 120 may utilize a plurality of factors including, but not limited to, device battery levels, device network speeds, polling rates, and device capabilities to determine which device monitors and records the measurements. For example, if user computing device 104 has a higher battery level than user computing device 114, then program 120 utilizes user computing device 104 to monitor and record the measurements rather than user computing device 114. In another example, if user computing device 104 is a device with a high polling capability, then program 120 utilizes user computing device 104 to take advantage of the increased sampling rate. In another embodiment, program 120 may utilize the ODB port of the vehicle to measure the driving metrics of the user. In this embodiment, the data from the ODB port can provide additional parameters and/or provide more accurate measurements than are possible with general-purpose devices such as a smartphone. In a further embodiment, program 120 utilizes GPS 108 to measure driving metrics along with geographical data. For example, program 120 may utilize GPS 108 to derive the maximum speed of a user on highways. In another embodiment, program 120 utilizes wearable computing devices (e.g., smartwatch, fitness tracker, etc.) to monitor the biometrics of the user in addition to the forces exerted on the user. The biometrics may include, but are not limited to, heartrate, perspiration rate, breathing rate, etc. For example, during a particularly stressful ride share, the heartrate of the user elevated to 100 beats per minute (BPM). In this example, program 120 associates the elevated heartrate to a driving event such as excessive speed and/or braking. In a further embodiment, program 120 may associate biometric data with GPS coordinates in addition to driving metrics. For example, a user, while traveling, has a sudden rise in breathing due to increased elevation. In this example, program 120 distinguishes said variation in breathing rate from a variation caused by a driving event. In an embodiment, program 120 may utilize ultrasonic sensors (e.g., parking sensors, blind spot sensors, etc.) to detect nearby vehicles and derive following distance parameters.

In some scenarios, each parameter may include a sampling rate. The sampling rate indicates how often program 120 polls a measurement device (e.g., user computing device 104, user computing device 114, etc.) for parameter information. In other scenarios, the sampling rate is a static, global value. In various scenarios, the sampling rate is a dynamic value. As such, program 120 can adjust the sampling rate based on a plurality of factors such as vehicle speed, traffic conditions, and device capabilities (e.g., battery capacity, wireless network speed, data storage capacity). In an example, program 120 increases the sampling rate to five data points a second when the vehicle is traveling at 70 mph and program 120 decreases the sampling rate to one data point a second when the vehicle is traveling at 15 mph.

Program 120 determines whether the driver is operating within the user profile (decision block 208).

In various embodiments, program 120 utilizes one or more rules to determine when a parameter deviation is a recorded offense. Rules consist of a condition and an associated action to be taken when the condition is triggered. For example, a rule defines a condition-action pair whereby braking too sharply results in an automatic corrective action such as a warning notification. In another embodiment, the same braking deviation results in program 120 recording a braking offense. In most embodiments, conditions are simple comparisons between the recorded driving metric and the user profile, specifically the user parameters. For example, a user parameter for maximum cornering is 0.92 g and the recorded driving metric is 1.02 g. In this example, program 120 determines that the driver deviated from the parameter and triggers the associated action.

In most embodiments, the recorded offenses may include details and data regarding the offense such as driver information (e.g., driver ID, vehicle type, driver age), trip information (e.g., destination, pick up location, weather, user ID) and offense information (e.g., driving metrics, passenger parameters, timestamps). The recorded offense and associated data may be stored in a table similar to the one depicted in FIG. 4.

In one scenario, program 120 may identify one or more rules defined as a global set of conditions and actions for all users and all offenses. In another scenario, program 120 may define rules on a per-user and/or regional basis, enabling rules to better reflect ride expectations in distinct markets. In various scenarios, program 120 may apply rules on a hierarchical basis. For example, program 120 applies per-driver rules before regional and global rules.

In some scenarios, one or more conditions related to a rule may include temporal constraints where a user parameter deviation must deviate for a specified (e.g., threshold) duration to be determined to be an offense. In an example, a rule condition for a maximum speed offense specifies that a driver must exceed the maximum speed for 25 seconds before program 120 triggers the associated action. In other scenarios, one or more conditions related to a rule may include a magnitude constraint where a user parameter deviation must deviate by a specified quantity or percentage to trigger the associated action. For example, a rule condition for braking force specifies that the deviation must exceed the user parameter by 10% before program 120 triggers the associated action. Similarly, conditions related to a rule may have upper limit constraints where in instances of extremely large deviations, program 120 may ignore and/or flag the deviation for further analysis. For example, if a driver greatly exceeds a braking force parameter, an indication of an emergency braking situation, then program 120 flags the offense for further review.

In most embodiments, rules include an offense threshold. An offense threshold is a numeric value delineating the number of parameter deviations needed to generate subsequent actions. In an embodiment, the user may specify a general offense threshold. In an example scenario, a user specifies a general offense threshold of two parameter deviations. In this example, program 120 allows the driver two parameter deviations before taking corrective or remedial action. In this embodiment, the general threshold applies, indiscriminately, to every offense. In a further embodiment, a user may set distinct thresholds for each offense. In an example scenario, the user sets a threshold of three cornering deviations and a threshold of two speeding parameter deviations before program 120 takes corrective and/or remedial action. In another embodiment, program 120 defines the offense threshold on a regional basis. For example, metropolitan regions have a higher offense threshold for certain parameter deviations such as following distance offenses, in this example the larger threshold compensates for the increased amount of traffic.

In other embodiments, the offense threshold is a dynamic general value based on the propensity of the driver for driving offenses. For example, for a driver who rarely deviates from the user parameters, program 120 dynamically sets a greater offense threshold for all offenses. Conversely, for a driver who consistently deviates, program 120 sets a lower threshold for all offenses. In a further embodiment, program 120 may dynamically set distinct thresholds for each potential offense. For example, program 120 sets an offense threshold of one for speed offenses and for following distance offenses program 120 sets an offense threshold of three. In another embodiment, program 120 may dynamically set the offense threshold based on historical offenses. For example, if the driver has many previous acceleration offenses, program 120 lowers the acceleration offense threshold. In some embodiments, program 120 assigns limitations on consecutive offenses. For example, program 120 sets a temporal limitation of one minute where a speeding offense prevents another speeding offense from triggering within a minute of the initial offense, allowing the driver the time to self-correct.

If program 120 determines that the driver is not operating within the user profile ("No" branch, decision block 208), then program 120 sends an action (step 210).

Program 120 sends an action (step 210). In various embodiments, the action taken is either a corrective action and/or a remedial action. Corrective notifications may include details about the recorded offense and coaching techniques that place the driver within the user parameters. For example, if a driver deviates from a minimum traveling distance parameter by traveling too closely, program 120 sends a corrective notification instructing the driver to place more distance between the vehicles. In some embodiments, program 120 may transmit the corrective notification to user computing device 104 using a plurality of transmission methods including, but not limited to, short message service (SMS), email, push notification, automated phone call, text-to-speech etc. For example, a driver receives a push notification on user computing device 104 after deviating from a maximum speed user parameter. In one embodiment, program 120 may utilize text-to-speech methods to provide auditory directions to the driver. In other embodiments, program 120 may utilize a plurality of factors when determining the instance of user computing device 114 to utilize, when to transmit the corrective action and the method of transmission. These factors include, but are not limited to, available devices, capabilities of available devices, weather conditions, traffic conditions, vehicle speed, etc. For example, if user computing device 114 is the only available device, then program 120 transmits a corrective action to user computing device 114 intended for the driver. In another example, if the driver is traveling at high speeds, then program 120 delays the corrective notification until program 120 determines that a notification would not unduly distract the driver. In yet another example, if weather conditions are severe, then program 120 sends the notification via text-to-speech.

In other embodiments, program 120 sends a remedial action if the driver ignores the corrective action and/or the driver grossly deviates from the user profile. In an embodiment, a remedial action may be a generalized action used for all offenses. For example, after a series of offenses, program 120 prevents the driver from accepting any new rides for a period of time. In an alternative embodiment, remedial actions may be a particular action for specific offenses. For example, numerous speeding offenses generate a specific remedial action, such as an increase in insurance premiums or revocation of a permit. Contrastingly, numerous following distance offenses generate a different remedial action, such as a citation or fine. In an embodiment, remedial actions are based upon the severity of the offense.

Still referring to step 210, in another embodiment, program 120 may send a remedial notification to the service operator of the driver. The service operator may be any company/entity that provides ride share, taxi, shipping, and/or transportation services. In addition, program 120 may also send a notification and/or report to a governmental regulatory body and/or law enforcement department. For example, if the driver is a taxi driver, program 120 sends a notification/report to the regional transportation authority. In some scenarios, the notification may include the name and ID of the driver, the user profile, offense data (e.g., timestamp, offense ID, offense conditions, weather conditions, etc.). In another scenario, the user may set what remedial action should take place. For example, after the driver exceeds the offense threshold, the user sets a remedial action of automatically terminating the ride share or taxi trip.

In another embodiment, program 120 may set governors or restrictions on the performance parameters of the vehicle, preventing the driver from deviating from user parameters. For example, if the user defines a maximum speed of 45 mph, then program 120 sets the maximum speed of a vehicle to 45 mph, preventing the driver from exceeding the parameter. Alternatively, program 120 may adjust the performance parameters of a vehicle to mimic the user profile. For example, program 120 adjusts the drive-by-wire throttle of the vehicle to prevent a driver from exceeding an acceleration user parameter. In yet another embodiment, program 120 may utilize user parameters to adjust performance parameters and driving patterns for autonomous vehicles.

Referring to decision block 2018, if program 120 determines that the driver is operating the vehicle within user parameters ("Yes" branch, decision block 208), then program 120 determines whether the trip is complete (decision block 212). For example, the program 120, while transporting a user, maintains a constant speed of 35 mph, never exceeding 50 mph. The parameters of the user specify that the user is comfortable with a maximum speed of 60 mph. In this example, program 120 determines that the driver is operating the vehicle within the parameters of the user. In an embodiment, program 120 may receive a ride complete notification from a ride sharing application signaling the ride share has completed. In another embodiment, program 120 may determine, utilizing either sensors 106 or GPS 108, that the user stopped traveling. In yet another embodiment, program 120 may receive a notification when the user exits the vehicle or when the computing device of the user (e.g. user computing device 114) leaves wireless range of the vehicle. In various embodiments, program 120 may prompt the user on a graphical user interface (not depicted) to determine whether the trip has completed. In many embodiments, program 120 may utilize natural language processing to determine whether the trip has ended. For example, program 120 detects a user saying, "Finished trip" and determines that the trip has completed.

If program 120 determines that the trip is not complete ("No" branch, decision block 212), program 120 continues to monitor and record driving measurements (step 206). If program 120 determines that the trip is complete ("Yes" branch, decision block 212), program 120 updates user parameters (step 214).

Program 120 updates user parameters (step 214). In some embodiments, program 120 may update the user profile and parameters with the results of the completed trip. For example, when the passenger of a ride share completes an unsatisfactory trip, program 120 utilizes the trip measurements and adjusts the user parameters accordingly. In another embodiment, program 120 may receive passenger feedback via a graphical user interface (not depicted). For example, after program 120 determines a trip has completed, the passenger can provide feedback for the trip. Feedback may include a simple positive or negative response such as "the trip was satisfactory" or "the trip was unpleasant". Feedback may also include detailed responses such as a "the trip was fine, but the driver braked too aggressively" response or "although my maximum speed parameter is 60 mph, I would rather the driver stay below 55 mph" response. In this example, program 120 adjusts the maximum speed parameter of the passenger from 60 mph to 55 mph. In another embodiment, the passenger may ignore an entire trip, portions of a trip or specific measurements. For example, after a particularly satisfactory trip, the passenger can request program 120 to ignore trip measurements, allowing the user greater control over the profile and parameter information.

Figure 3:
FIG. 3 depicts table 300, which is an example of a table representing a set of user parameters.

FIG. 3 depicts table 300, which is an example of a table representing a user profile, specifically user parameters as described in step 202. Table 300 includes a row corresponding to each of the one or more user parameters delineating the preferred driving metrics of the user. Table 300 includes a user ID, timestamp and the following parameters: max speed, max acceleration, average acceleration, maximum braking force, average braking force, maximum cornering force, average cornering force, and minimum following distance.

Figure 4:
FIG. 4 depicts table 400, which is an example of a table representing a recorded offense.

FIG. 4 depicts table 400, which is an example of a table representing a recorded offense, specifically a maximum acceleration deviation. Table 400 includes a row corresponding to each of the one or more offense details described in decision block 208. Table 400 includes the following: driver ID, driver age, trip ID, vehicle type, destination address and/or coordinates, pick up address and/or coordinates, weather conditions, user ID, relevant user parameters, offense type, deviating metric, correction Boolean, and offense timestamp.

Figure 5:
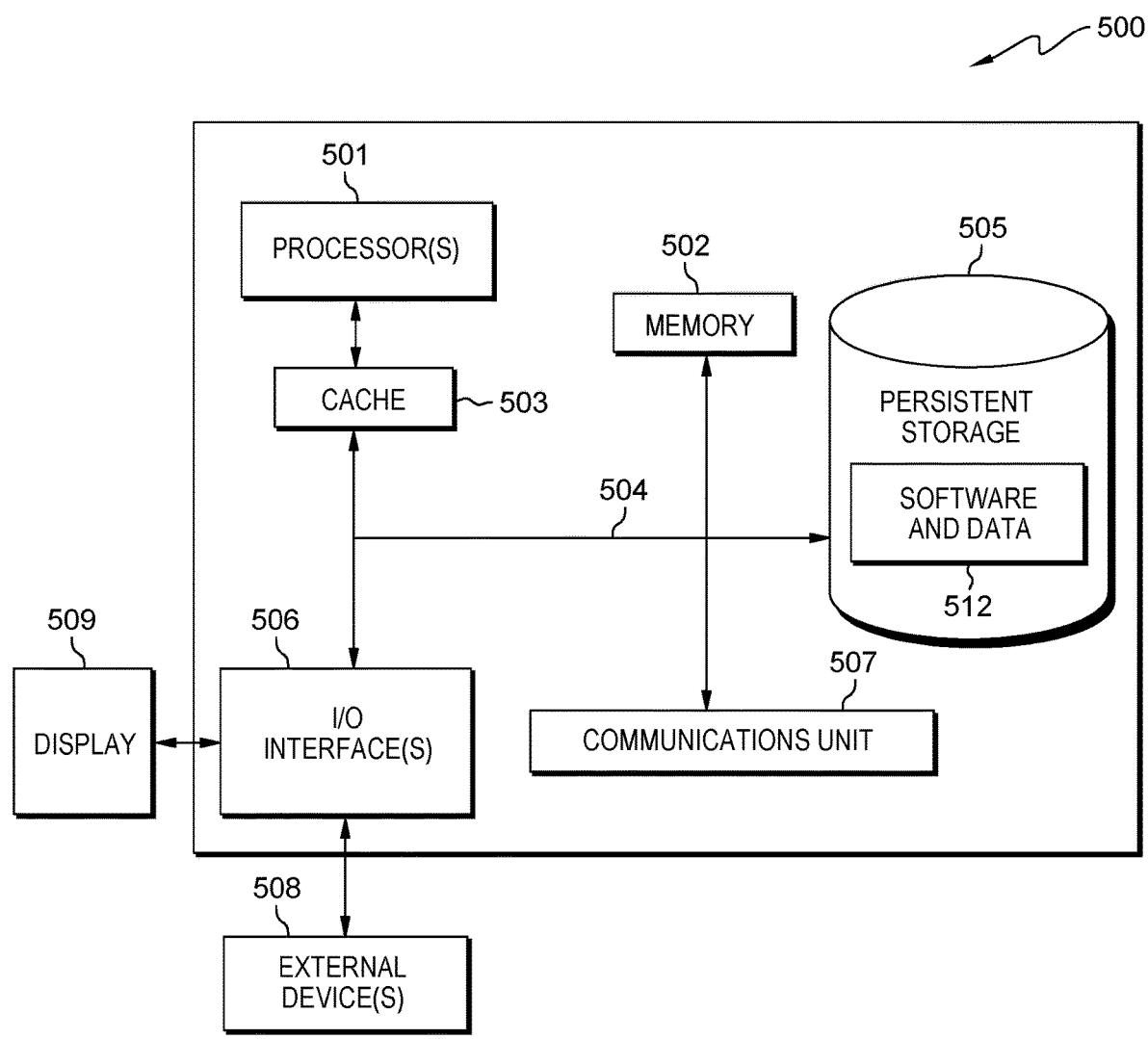
FIG. 5 is a block diagram of components of the server computer executing the program within the distributed data processing environment of FIG. 1, in accordance with an embodiment of the present invention.

FIG. 5 depicts a block diagram of components of server computer 110 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server computer 110 includes communications fabric 504, which provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near accessed data, from memory 502.

Program 120 may be stored in persistent storage 505 and in memory 502 for execution by one or more of the respective computer processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 can be stored in persistent storage 505 for access and/or execution by one or more of the respective processors 501 via cache 503.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data (e.g., software and data 512) used to practice embodiments of the present invention may be downloaded to persistent storage 505 through communications unit 507.

I/O interface(s) 506 allows for input and output of data with other devices that may be connected to server computer 110. For example, I/O interface(s) 506 may provide a connection to external device(s) 508, such as a keyboard, a keypad, a touch screen, and/or some other suitable input device. External devices 508 can also include portable computer readable storage media such as, for example, thumb drives, portable optical or magnetic disks, and memory cards. Software and data used to practice embodiments of the present invention, e.g., program 120, can be stored on such portable computer readable storage media and can be loaded onto persistent storage 505 via I/O interface(s) 506. I/O interface(s) 506 also connect to a display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    identifying, by one or more computer processors, a user profile comprised of historical vehicle occupancy data of a user utilizing one or more computing devices, wherein the user profile represents the driving behaviors and patterns specific to the user and is adjusted from one or more driving metrics associated with the user as a driver;
    determining, by one or more computer processors, whether to monitor a computing device from the one or more computing devices located in a vehicle based on a respective computing device battery level, computing device network speed, and computing device polling rate;
    determining, by one or more computer processors, a sampling rate associated with the determined computing device based on a vehicle speed and vehicle traffic conditions;
    monitoring, by one or more computer processors, one or more driving metrics and user biometric data of the user while the user is a passenger utilizing the determined computing device and the determined sampling rate, wherein biometric data includes heartrate, perspiration rate, and breathing rate;
    determining, by one or more computer processors, whether the one or more driving metrics exceed a parameter threshold based, at least in part, on a comparison of the monitored one or more driving metrics, user biometric data, and the user profile, wherein the one or more driving metrics that exceed the parameter threshold are parameter deviations that have respective deviation duration thresholds and deviation magnitude constraints;
    responsive to determining that the vehicle exceeding the parameter threshold, determining, by one or more computer processors, whether the parameter deviations exceed an offense threshold, wherein the offense threshold delineates a threshold number of parameter deviations needed to generate an action; and
    determining, by one or more computer processors, an action based, at least in part, on the vehicle exceeding the offense threshold, capabilities of the computing devices, weather conditions, traffic conditions, and vehicle speed.

2. The method of claim 1, wherein identifying the user profile further comprises;
    identifying, by one or more computer processors, user defined parameters; and
    identifying, by one or more computer processors, regulatory parameters.

3. The method of claim 1, wherein determining whether a vehicle exceeds the parameter threshold based, at least in part, on the comparison of the monitored one or more driving metrics, user biometric data, and the user profile further comprises:
    identifying, by one or more computer processors, one or more associated ride share profiles; and
    updating, by one or more computer processors, the user profile with the one or more identified associated ride share profiles.

4. The method of claim 1, wherein monitoring one or more driving metrics is based on at least one of the following: vehicle speed, vehicle acceleration, vehicle braking, vehicle cornering, user biometrics, and vehicle following distance.

5. The method of claim 1, wherein determining whether a vehicle exceeds the parameter threshold based, at least in part, on the comparison of the monitored one or more driving metrics, user biometric data, and the user profile further comprises:
identifying, by one or more computer processors, associated rules and conditions; and
determining, by one or more computer processors, based, at least in part, on the identified associated rules and conditions, whether the monitored one or more driving metrics deviate from identified associated rules and conditions.

6. The method of claim 1, wherein determining an action based, at least in part, on the vehicle exceeding the offense threshold, capabilities of the computing devices, weather conditions, traffic conditions, and vehicle speed further comprises: sending, by one or more computer processors, a correction notification.

7. The method of claim 6, further comprises:
responsive to sending a corrective notification, determining, by one or more computer processors, whether the monitored one or more driving metrics exceeds the parameter threshold a second time; and
responsive to determining that the vehicle exceeds the offense threshold the second time, sending, by one or more computer processors, a remedial notification.

8. The method of claim 1, wherein the user profile data is based, at least in part, on user driving history, user feedback, and historical ride share trips.

9. The method of claim 1, further comprising:
updating, by the one or more computer processors, the historical vehicle occupancy data based, at least in part, on user feedback and the monitored one or more driving metrics.

10. The method of claim 1, further comprising:
determining, by the one or more computer processors, one or more performance parameters of the vehicle;
calculating, by the one or more computer processors, a deviation between the one or more performance parameters of the vehicle and one or more user parameters; and
adjusting, by the one or more computer processors, the one or more performance parameters of the vehicle based on the calculated deviation between the one or more performance parameters and the one or more user parameters.

11. A computer program product comprising:
one or more computer readable storage media and program instructions stored on the one or more computer readable storage media, the program instructions comprising:
program instructions to identify a user profile comprised of historical vehicle occupancy data of a user utilizing one or more computing devices, wherein the user profile represents the driving behaviors and patterns specific to the user and is adjusted from one or more driving metrics associated with the user as a driver;
program instructions to determine whether to monitor a computing device from the one or more computing devices located in a vehicle based on a respective computing device battery level, computing device network speed, and computing device polling rate;
program instructions to determine a sampling rate associated with the determined computing device based on a vehicle speed and vehicle traffic conditions;
program instructions to monitor one or more driving metrics and user biometric data of the user while the user is a passenger utilizing the determined computing device and the determined sampling rate, wherein biometric data includes heartrate, perspiration rate, and breathing rate;
program instructions to determine whether the one or more driving metrics exceed a parameter threshold based, at least in part, on a comparison of the monitored one or more driving metrics, user biometric data, and the user profile, wherein the one or more driving metrics that exceed the parameter threshold are parameter deviations that have respective deviation duration thresholds and deviation magnitude constraints;
program instructions to responsive to determining that the vehicle exceeding the parameter threshold, determine whether the parameter deviations exceed an offense threshold, wherein the offense threshold is delineates a threshold number of parameter deviations needed to generate an action; and
program instructions to determine an action based, at least in part, on the vehicle exceeding the offense threshold, capabilities of the computing devices, weather conditions, traffic conditions, and vehicle speed.

12. The computer program product of claim 11, wherein determining whether a vehicle exceeds the parameter threshold based, at least in part, on the comparison of the monitored one or more driving metrics, user biometric data, and the user profile comprises program instructions to:
identify associated rules and conditions; and
determine based, at least in part, on the identified associated rules and conditions, whether the monitored one or more driving metrics deviate from identified associated rules and conditions.

13. The computer program product of claim 11, wherein identifying the user profile comprises program instructions to:
identify user defined parameters; and
identify regulatory parameters.

14. The computer program product of claim 11 further comprises program instructions to:
determine one or more performance parameters of the vehicle;
calculate a deviation between the one or more performance parameters of the vehicle and one or more user parameters; and
adjust the one or more performance parameters of the vehicle based on the calculated deviation between the one or more performance parameters and the one or more user parameters.

15. A computer system comprising:
one or more computer processors;
one or more computer readable storage media; and
program instructions stored on the computer readable media for execution by at least one of the one or more processors, the program instructions comprising:
program instructions to identify a user profile comprised of historical vehicle occupancy
data of a user utilizing one or more computing devices, wherein the user profile represents the driving behaviors and patterns specific to the
user and is adjusted from one or more driving metrics associated with the user as a
driver;
program instructions to determine whether to monitor a computing device from the one or more computing devices located in a vehicle based on a respective computing device battery level, computing device network speed, and computing device polling rate;

program instructions to determine a sampling rate associated with the determined computing device based on a vehicle speed and vehicle traffic conditions;
program instructions to monitor one or more driving metrics and user biometric data of the user while the user is a passenger utilizing the determined computing device and the determined sampling rate, wherein biometric data includes heartrate, perspiration rate, and breathing rate;
program instructions to determine whether the one or more driving metrics exceed a parameter threshold based, at least in part, on a comparison of the monitored one or more driving metrics, user biometric data, and the user profile, wherein the one or more driving metrics that exceed the parameter threshold are parameter deviations that have respective deviation duration thresholds and deviation magnitude constraints;
program instructions to responsive to determining that the vehicle exceeding the parameter threshold, determine whether the parameter deviations exceed an offense threshold, wherein the offense threshold delineates a threshold number of parameter deviations needed to generate an action; and
program instructions to determine an action based, at least in part, on the vehicle exceeding the offense threshold, capabilities of the computing devices, weather conditions, traffic conditions, and vehicle speed.

16. The computer system of claim 15, wherein determining whether a vehicle exceeds the parameter threshold based, at least in part, on the comparison of the monitored one or more driving metrics, user biometric data, and the user profile comprises program instructions to:
identify associated rules and conditions; and
determine based, at least in part, on the identified associated rules and conditions, whether the monitored one or more driving metrics deviate from identified associated rules and conditions.

17. The computer system of claim 15, wherein identifying the user profile comprises program instructions to:
identify user defined parameters; and
identify regulatory parameters.

18. The computer system of claim 15, comprises program instructions to:
determine one or more performance parameters of the vehicle;
calculate a deviation between the one or more performance parameters of the vehicle and one or more user parameters; and
adjust the one or more performance parameters of the vehicle based on the calculated deviation between the one or more performance parameters and the one or more user parameters.

* * * * *